Figure 1:
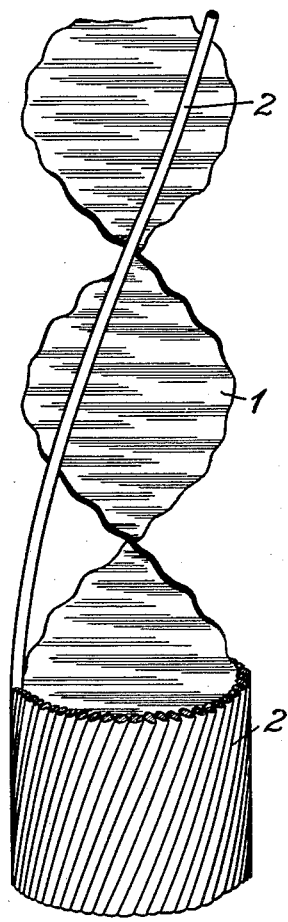

Patented July 9, 1929.

1,720,213

UNITED STATES PATENT OFFICE.

AUGUST FUCHS, OF BERLIN-SIEMENSSTADT, AND FERDINAND HANFF, OF BERLIN-CHARLOTTENBURG, AND GUSTAV LANZ, OF BERLIN-LICHTERFELDE, GERMANY, ASSIGNORS TO SIEMENS-SCHUCKERTWERKE GESELLSCHAFT MIT BESCHRANKTER HAFTUNG, OF SIEMENSSTADT, NEAR BERLIN, GERMANY, A CORPORATION OF GERMANY.

SUPPORTING ELEMENT FOR HOLLOW ELECTRIC CONDUCTORS AND APPARATUS FOR MANUFACTURING THE SAME.

Application filed June 17, 1926, Serial No. 116,614, and in Germany June 23, 1925.

Our invention relates to a supporting element for hollow electric conductors and to apparatus for manufacturing the same.

It has already been proposed to produce hollow conductors for the transmission of the electric current by stranding the conductors on a twisted support of flat cross-section. If a flat metal strip or tape, for instance, is employed as such a support, it is found impossible to twist this into turns of any desired shortness because the material is during the twisting at both edges subjected to a very strong expansion in comparison with the central portion of the strip. A metal strip, particularly a thin one, is, however, not able to withstand such a strain. It is, on the other hand, very desirable that the support should be provided with turns as short as possible, in order that the conductors located upon it should be supported at as many points as possible.

The object of our invention is to provide a supporting element or member for hollow electric conductors, which consists of a flat thin metal strip and is thus very light yet able to be twisted in short turns and offering great resistance to compression strains.

We attain this end in view by employing as support a thin metal strip which is corrugated, at least in its central portion. The greater the amplitude of the corrugations the shorter the turns may be made. As compared with a twisted support made from flat metal strip, the corrugated strip may easily be provided with turns only half the pitch. The corrugations of the strip have the further advantage that the support is rendered far more rigid and possesses diametrically a high moment of resistance, so that it cannot be crushed by the load applied to it. The two longitudinal edges of the support are during the twisting operation able to expand in relation to the central portion of the strip and are thus protected against excessive tensional strains. The improved supporting member possesses a high tensional strength in the longitudinal direction since it extends substantially in the longitudinal direction of the conductor and consequently no deformation of the support occurs by a longitudinal pull but a pure straining of the material. This fact ensures also a true caliber of the supporting element, inasmuch as it maintains the original diameter even under considerable tensional strains so that the line wires do not lose their support at any point and thereby the round shape of the conductor is maintained.

In order to provide still more points of support for the line wires, a wire helix may be inserted into recesses along the edges of the twisted strip or worm. This helix may have the same pitch as the twisted strip, but it may equally well be coiled less steeply. It is, furthermore, immaterial whether it possesses a twist in the same direction as the strip or in an opposite direction. It is also possible to distribute the strains entirely separately upon the twisted strip and the wire helix, by making the twisted strip of a smaller external diameter than the wire helix. In this case the wire helix will take up the entire radial pressure for which purpose it is well adapted owing to the stiffening by means of the twisted strip and the simultaneously attained protection against the tipping of the individual turns while the twisted strip, which possesses great tensile strength, mainly serves for taking up the tensile strain during the manufacture of the hollow conductor and for supporting the wire helix against tipping. The wire helix may consist of wire of any section, such as round wire, T-shaped, U-shaped or wedge-shaped section wire. In the case of T-shaped and wedge-shaped section wire the broadened edge of the wire should preferably be located outside, while in the case of U-shaped section wire the two limbs should preferably be placed outside so that rainwater cannot accumulate in the wire helix. If the twisted strip is also called upon to take up directly the radial pressure, the edges of the strip should preferably be turned over or doubled back so that the line wires find a broader support upon the edge of the twisted strip.

Figure 2:
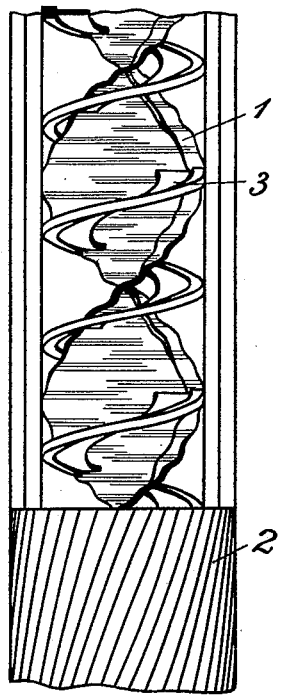
Figure 3:
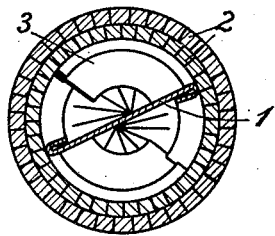
Figure 4:
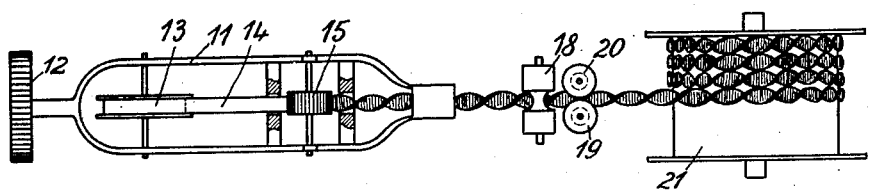
Figure 5:
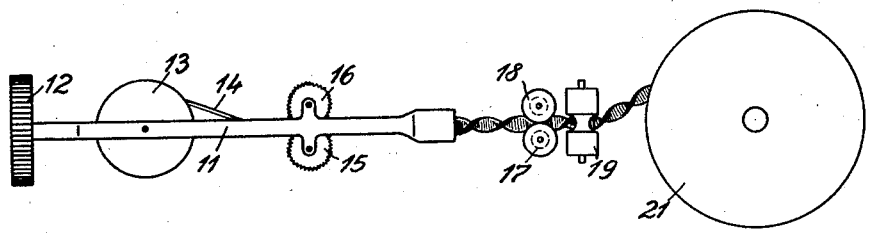

The drawings affixed hereto show in:

Fig. 1 a hollow rope provided with the improved twisted strip support, part of the rope being cut away, Fig. 2, a hollow conductor provided with the improved twisted strip combined with a wire helix, in sectional elevation, Fig. 3, a cross-section through Fig. 2, Fig. 4, an apparatus suitable for manufacturing the improved support in plan and Fig. 5, a side-elevation of Fig. 4.

Like parts are indicated by like numerals of reference in all the figures of the drawing.

Referring to Fig 1 it will be seen that line wires 2 are stranded over a supporting member 1 consisting of a corrugated flat metal strip according to our invention. In Fig. 2 a supporting element consisting of a flat corrugated strip is illustrated, in recesses of which a wire helix 3 is inserted. The line wires 2 are again stranded over this supporting element. Fig. 3 illustrates such a hollow conductor in cross-section showing the corrugated metal strip 1, the wire helix 3 and the line wires 2. The edges of the strip are here shown turned over, doubled back or beaded, in order to offer a larger supporting surface to the line wires.

The manufacture of the supporting element or member according to our invention takes place in a single operation. In the Figures 4 and 5 suitable apparatus for manufacturing the supporting member is shown in plan and elevation. A yoke 11 adapted to be rotated around its longitudinal axis by means of a gearing 12 carries the reel 13 which contains the flat strip 14. The strip passes from the reel to the toothed wheels 15, 16 likewise journaled in the yoke which impart the corrugations to the strip. The corrugated strip is then led between the pairs of rollers 17, 18 and 19, 20, one of which is disposed horizontally and the other vertically, so that the strip is prevented from rotating. When the yoke 11 rotates, the strip is twisted between the rotating toothed wheels and the stationary rollers and then passes either to a storage drum or it is directly introduced into the stranding machine.

Various modifications and changes may be made without departing from the spirit and the scope of our invention, and we desire, therefore, that only such limitations shall be placed thereon as are imposed by the prior art.

We claim as our invention:

1. A supporting element for hollow electric conductors consisting of a twisted corrugated metal strip.

2. A supporting element for hollow electric conductors consisting of a twisted metal strip corrugated in its central portion.

3. A supporting element for hollow electric conductors consisting of a twisted corrugated metal strip and a wire helix inserted in recesses of said strip.

4. A supporting element for hollow electric conductors consisting of a twisted metal strip corrugated in its central portion and a wire helix inserted in recesses of said strip.

5. A supporting element for hollow electric conductors consisting of a twisted corrugated metal strip and a wire helix of equal external diameter as said strip inserted in recesses of said strip.

6. A supporting element for hollow electric conductors consisting of a twisted metal strip corrugated in its central portion and a wire helix of equal external diameter as said strip inserted in recesses of said strip.

7. A supporting element for hollow electric conductors consisting of a twisted corrugated metal strip and a wire helix twisted in the same direction as said strip inserted in recesses of said strip.

8. A supporting element for hollow electric conductors consisting of a twisted metal strip corrugated in its central portion and a wire helix twisted in the same direction as said strip inserted in recesses of said strip.

9. A supporting element for hollow electric conductors consisting of a twisted corrugated metal strip and a wire helix of oppositely directed twist to said strip inserted in recesses of said strip.

10. A supporting element for hollow electric conductors consisting of a twisted metal strip corrugated in its central portion and a wire helix of oppositely directed twist to said strip inserted in recesses of said strip.

11. A supporting element for hollow electric conductors consisting of a twisted corrugated metal strip and a wire helix of the same pitch as said strip inserted in recesses of said strip.

12. A supporting element for hollow electric conductors consisting of a twisted metal strip corrugated in its central portion and a wire helix of the same pitch as said strip inserted in recesses of said strip.

13. A supporting element for hollow electric conductors consisting of a twisted corrugated metal strip and a wire helix of different pitch from said strip inserted in recesses of said strip.

14. A supporting element for hollow electric conductors consisting of a twisted metal strip corrugated in its central portion and a wire helix of different pitch from said strip inserted in recesses of said strip.

15. A supporting element for hollow electric conductors consisting of a twisted corrugated metal strip with turned-over edges.

16. A supporting element for hollow electric conductors consisting of a twisted metal strip corrugated in its central portion and with turned-over edges.

17. A supporting element for hollow electric conductors consisting of a twisted corrugated metal strip and a wire helix inserted in recesses of said strip with turned-over edges.

18. A supporting element for hollow electric conductors consisting of a twisted corrugated metal strip and a wire helix of equal external diameter as said strip inserted in recesses of said strip with turned-over edges.

19. A supporting element for hollow electric conductors consisting of a twisted corrugated metal strip and a wire helix of larger external diameter than said strip inserted in recesses of said strip with turned-over edges.

20. A supporting element for hollow electric conductors consisting of a twisted corrugated metal strip and a wire helix of equally directed twist as said strip inserted in recesses of said strip with turned-over edges.

21. A supporting element for hollow electric conductors consisting of a twisted corrugated metal strip and a wire helix of oppositely directed twist to said strip inserted in recesses of said strip with turned-over edges.

22. A supporting element for hollow electric conductors consisting of a twisted corrugated metal strip and a wire helix of the same pitch as said strip inserted in recesses of said strip with turned-over edges.

23. A supporting element for hollow electric conductors consisting of a twisted corrugated metal strip and a wire helix of different pitch from said strip inserted in recesses of said strip with turned-over edges.

In testimony whereof we affix our signatures.

AUGUST FUCHS.
FERDINAND HANFF.
GUSTAV LANZ.